(12) United States Patent
Nagai et al.

(10) Patent No.: US 9,558,856 B2
(45) Date of Patent: Jan. 31, 2017

(54) CONTROL SYSTEM FOR PLANT (75) Inventors: Tetsuro Nagai, Tokyo (JP); Hidekazu Satake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 286 days.

(21) Appl. No.: 13/816,172

(22) PCT Filed: Aug. 2, 2011

(86) PCT No.: PCT/JP2011/067683
§ 371 (c)(1),
(2), (4) Date: Feb. 8, 2013

(87) PCT Pub. No.: WO2012/020666
PCT Pub. Date: Feb. 16, 2012

(65) Prior Publication Data
US 2013/0136222 A1    May 30, 2013

(30) Foreign Application Priority Data

Aug. 12, 2010 (JP) ................................ 2010-181025

(51) Int. Cl.
*G21C 7/36* (2006.01)
*G21D 3/04* (2006.01)
(Continued)

(52) U.S. Cl.
CPC .......... *G21D 3/04* (2013.01); *G21C 7/00* (2013.01); *G21D 3/00* (2013.01); *G21D 2003/007* (2013.01); *Y02E 30/39* (2013.01)

(58) Field of Classification Search
CPC .............. G21C 7/00; G21C 7/06; G21C 7/08; G21C 7/36; G21C 17/108; G21D 3/00; G21D 3/001; G21D 3/08; G21D 3/10
(Continued)

(56) References Cited

U.S. PATENT DOCUMENTS 4,434,132 A * 2/1984 Cook ............................ 376/259
4,584,165 A * 4/1986 Wilson et al. ................ 376/216
(Continued)

FOREIGN PATENT DOCUMENTS

JP  01-309102 A  12/1989
JP  04-101201 A  4/1992
(Continued)

OTHER PUBLICATIONS

English translation of Written Opinion of PCT/JP2011/067683, mailing date of Aug. 30, 2011.
(Continued)

*Primary Examiner* — Jack W Keith
*Assistant Examiner* — Sharon M Davis
(74) *Attorney, Agent, or Firm* — Westerman, Hattori, Daniels & Adrian, LLP (57) ABSTRACT

In a control system for a plant controlling a plant such as a nuclear power plant 1 with use of a plurality of digital control devices 41, the plurality of digital control devices 41 include a plurality of control functions 46 to 56, and the plurality of control functions 46 to 56 are provided in the plurality of digital control devices 41 in a distributed manner so that the digital control devices 41 may not fall below safety standards preset by safety analyses. This provides a control system for a plant using the plurality of digital control devices 41 and configured to control a plant safely even when a digital control device is failed.

19 Claims, 2 Drawing Sheets

(51) Int. Cl.
*G21C 7/00* (2006.01)
*G21D 3/00* (2006.01)

(58) Field of Classification Search
USPC .................................. 376/215, 216, 217, 219
See application file for complete search history.

(56) References Cited

U.S. PATENT DOCUMENTS

| | | | | |
|---|---|---|---|---|
| 4,804,515 | A * | 2/1989 | Crew | ....................... G06F 11/16 |
| | | | | 376/215 |
| 5,287,264 | A * | 2/1994 | Arita et al. ....................... 700/79 |
| 5,311,562 | A * | 5/1994 | Palusamy et al. ............ 376/215 |
| 5,984,504 | A * | 11/1999 | Doyle ....................... G05B 9/03 |
| | | | | 376/216 |
| 6,049,578 | A * | 4/2000 | Senechal et al. ............. 376/215 |
| 6,532,550 | B1 * | 3/2003 | Crew et al. ..................... 714/11 |

FOREIGN PATENT DOCUMENTS

| | | |
|---|---|---|
| JP | 04-248798 A | 9/1992 |
| JP | 2008-020957 A | 1/2008 |

OTHER PUBLICATIONS

International Search Report of PCT/JP2011/067683, mailing date of Aug. 30, 2011.
Written Opinion of PCT/JP2011/067683, mailing date of Aug. 30, 2011.
Japanese Decision to Grant a Patent dated Sep. 16, 2014, issued in Japanese Patent Application No. 2010-181025, w/partial English translation (2 pages).

* cited by examiner

FIG.1

CONTROL SYSTEM FOR PLANT

FIELD

The present invention relates to a control system for a plant controlling a plant with use of a plurality of digital control devices.

BACKGROUND

Conventionally known is a distributed control system including a host control device, local control devices, and an integrated control device (for example, refer to Patent Literature 1). In this distributed control system, the host control device monitors and controls an overall plant, the local control devices control individual units in the plant, and the integrated control device integrates and controls the local control devices by function. The host control device includes a plant control means having an equal function to that of a plant control means of the integrated control device so as to perform plant control instead of the integrated control device at the time of occurrence of a failure of the integrated control device.

CITATION LIST

Patent Literature

Patent Literature 1: Japanese Patent Application Laid-open No. 04-248798

SUMMARY

Technical Problem

However, the conventional distributed control system additionally has the plant control means of the host control device since the host control device has an equal plant control means to that of the integrated control device. Thus, the number of components in the host control device increases, which causes an increase of device cost. On the other hand, in a case where a configuration of the host control device is not changed, the integrated control device cannot control the local control devices when a failure occurs in the integrated control device.

An object of the present invention is to provide a control system for a plant using a plurality of digital control devices and enabling to control a plant safely even when a digital control device is failed.

Solution to Problem

According to an aspect of the present invention, in a control system for a plant for controlling a plant with use of a plurality of digital control devices, the plurality of digital control devices include a plurality of control means, and the plurality of control means are provided in the plurality of digital control devices in a distributed manner so that the digital control devices may not fall below safety standards preset by safety analyses.

With the above configuration, the plurality of control means can be distributed into the plurality of digital control devices. Accordingly, even in a case where one digital control device is failed to disable one control means, other control means in other digital control devices can control the plant. Thus, other digital control devices can control the plant safely without falling below the safety standards.

Advantageously, in the control system for a plant, the plant is a nuclear power plant including a nuclear reactor, a plurality of steam generators connected to the nuclear reactor, and a plurality of main feed water systems configured to supply a coolant to the respective steam generators, the plurality of control means include a plurality of feed water control means controlling the respective main feed water systems, and the plurality of feed water control means are distributed into the different digital control devices, respectively.

With the above configuration, the plurality of feed water control means respectively controlling the plurality of main feed water systems can be distributed into the plurality of digital control devices. Accordingly, even in a case where one digital control device is failed to disable one feed water control means to control one main feed water system, other feed water control means in other digital control devices can control other main feed water systems, respectively.

Advantageously, in the control system for a plant, the plant is a nuclear power plant including a nuclear reactor, the plurality of control means include an actuation control means controlling actuation of a unit provided in the nuclear power plant and an interlock control means locking actuation control by the actuation control means, and the actuation control means and the interlock control means locking actuation control are distributed into the different digital control devices, respectively.

With the above configuration, the actuation control means and the interlock control means locking actuation control can be distributed into the plurality of digital control devices. Accordingly, even in a case where one digital control device is failed to cause the actuation control means to be actuated improperly, the interlock control means in the other digital control device can lock actuation control by the actuation control means. Also, even in a case where the other digital control device is failed to disable the interlock control means to function, the actuation control means in one digital control device can control actuation of the unit suitably.

Advantageously, in the control system for a plant, the plant is a nuclear power plant including a nuclear reactor housing therein a fuel assembly, a control rod driving unit enabling to drive a control rod to be inserted in the fuel assembly, a steam generator connected to the nuclear reactor, and a main feed water system enabling to supply a coolant to the steam generator, the plurality of control means include a control rod driving control means controlling the control rod driving unit and a feed water control means controlling the main feed water system, and the control rod driving control means and the feed water control means are distributed into the different digital control devices, respectively.

With the above configuration, the control rod driving control means and the feed water control means can be distributed into the plurality of digital control devices. Accordingly, even in a case where one digital control device is failed to cause the control rod driving control means to be actuated improperly, the feed water control means in the other digital control device can control the main feed water system. Also, even in a case where the other digital control device is failed to disable the feed water control means to control the main feed water system, the control rod driving control means in one digital control device can control the control rod driving unit suitably.

Advantageously, in the control system for a plant, the plant is a nuclear power plant including a nuclear reactor housing therein a fuel assembly and a control rod to be inserted in the fuel assembly and a boron concentration control unit enabling to control boron concentration in a coolant circulating in the nuclear reactor, the plurality of control means include a control rod shutdown margin monitor means enabling to monitor a shutdown margin of the nuclear reactor by the control rod and a boron concentration control means controlling the boron concentration control unit, and the control rod shutdown margin monitor means and the boron concentration control means are distributed into the different digital control devices, respectively.

With the above configuration, the control rod shutdown margin monitor means and the boron concentration control means can be distributed into the plurality of digital control devices. Accordingly, even in a case where one digital control device is failed to disable the control rod shutdown margin monitor means to function, the boron concentration control means in the other digital control device can control boron concentration. Also, even in a case where the other digital control device is failed to disable the boron concentration control means to control the boron concentration control unit, the control rod shutdown margin monitor means in one digital control device can monitor a shutdown margin of the nuclear reactor by the control rod.

Advantageously, in the control system for a plant, each of the plurality of digital control devices includes a plurality of computing units.

With the above configuration, the digital control devices include the plurality of computing units. Thus, even in a case where one computing unit is not actuated due to a failure, other computing units can execute the control functions. This can avoid loss of functions of the digital control devices caused by a single failure.

Advantageous Effects of Invention

With the control system for a plant according to the present invention, even in a case where one digital control device has a problem, other digital control devices can control a plant safely.

DESCRIPTION OF EMBODIMENTS

Hereinafter, a control system for a plant according to the present invention will be described with reference to the attached drawings. It is to be noted that the present invention is not limited to the following embodiments. Also, components in the following embodiments include ones that are replaceable and practiced easily by a person skilled in the art or substantially identical ones.

EMBODIMENTS

Figure 1:
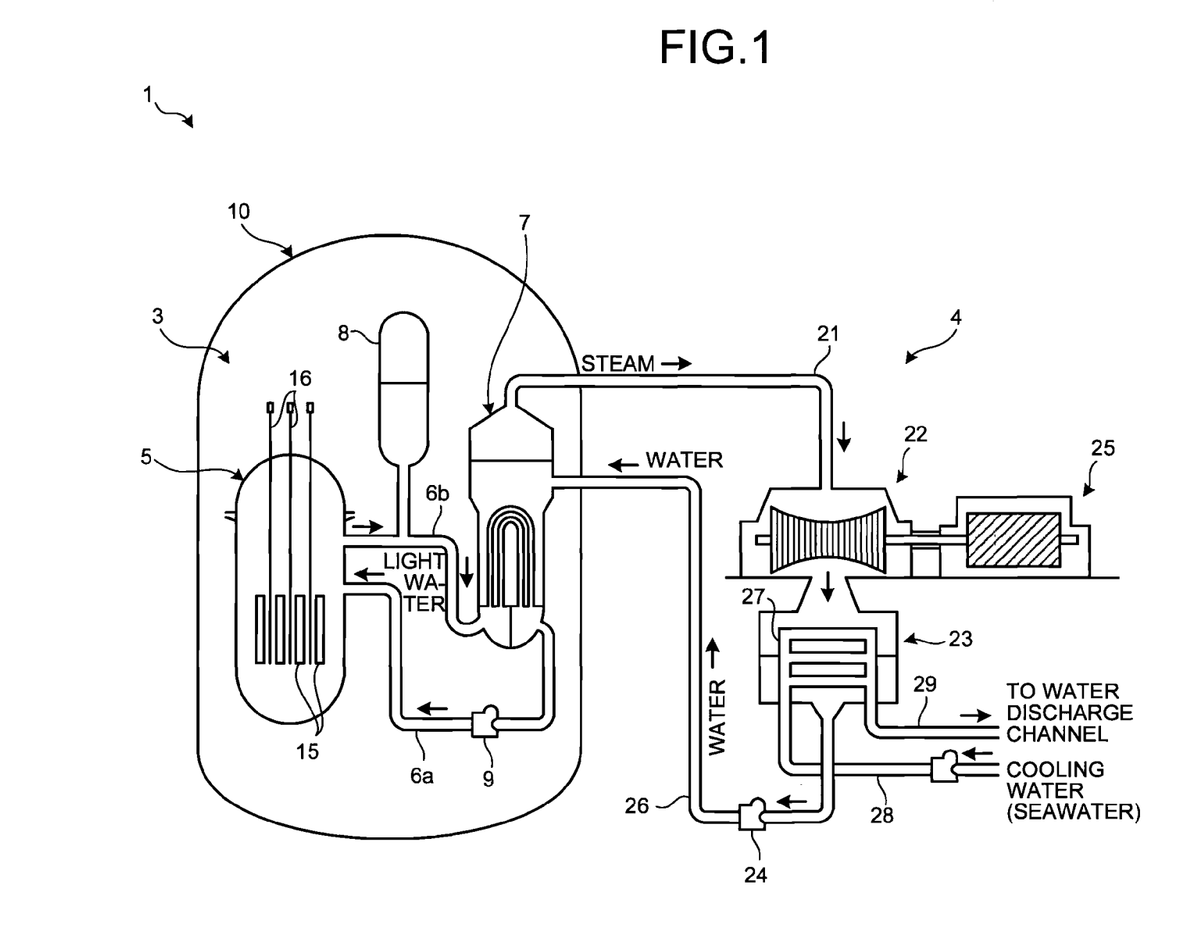
FIG. 1 is a schematic view illustrating a nuclear power plant controlled by a control system according to an embodiment.

FIG. 1 is a schematic view illustrating a nuclear power plant controlled by a control system according to the present embodiment. A control system 40 for a plant according to the present invention is adapted to control a nuclear power plant 1 including a nuclear reactor 5 as a plant, and a pressurized water reactor (PWR) is used as the nuclear reactor 5, for example. The nuclear power plant 1 using this pressurized water reactor 5 includes a nuclear reactor cooling system 3 including the nuclear reactor 5 and a turbine system 4 performing heat exchange with the nuclear reactor cooling system 3, and a nuclear reactor coolant circulates in the nuclear reactor cooling system 3 while a secondary coolant circulates in the turbine system 4.

The nuclear reactor cooling system 3 includes the nuclear reactor 5 and a steam generator 7 connected to the nuclear reactor 5 via a cold leg 6a and a hot leg 6b. Also, a pressurizer 8 is interposed in the hot leg 6b while a nuclear reactor coolant pump 9 is interposed in the cold leg 6a. The nuclear reactor 5, the cold leg 6a, the hot leg 6b, the steam generator 7, the pressurizer 8, and the nuclear reactor coolant pump 9 are housed in a nuclear reactor containment vessel 10.

The nuclear reactor 5 is a pressurized water reactor as described above and is filled therein with the nuclear reactor coolant. In the nuclear reactor 5, multiple fuel assemblies 15 are housed, and multiple control rods 16 controlling nuclear fission of the fuel assemblies 15 are provided to enable insertion into the respective fuel assemblies 15.

When the fuel assemblies 15 are subjected to nuclear fission while nuclear fission reactions are controlled by the control rods 16, heat energy is generated by this nuclear fission. The generated heat energy heats the nuclear reactor coolant, and the heated nuclear reactor coolant is sent to the steam generator 7 via the hot leg 6b. On the other hand, the nuclear reactor coolant sent from the steam generator 7 via the cold leg 6a flows in the nuclear reactor 5 and cools the inside of the nuclear reactor 5.

The pressurizer 8 interposed in the hot leg 6b pressurizes the nuclear reactor coolant heated to a high temperature to restrict boiling of the nuclear reactor coolant. Also, the steam generator 7 causes the high-temperature and high-pressure nuclear reactor coolant to undergo heat exchange with the secondary coolant to evaporate the second coolant to generate steam and cool the high-temperature and high-pressure nuclear reactor coolant. The nuclear reactor coolant pump 9 circulates the nuclear reactor coolant in the nuclear reactor cooling system 3. The nuclear reactor coolant pump 9 sends the nuclear reactor coolant from the steam generator 7 via the cold leg 6a to the nuclear reactor 5 and sends the nuclear reactor coolant from the nuclear reactor 5 via the hot leg 6b to the steam generator 7.

Here, a sequence of operations in the nuclear reactor cooling system 3 of the nuclear power plant 1 will be described. When the nuclear reactor coolant is heated by heat energy generated by nuclear fission reactions in the nuclear reactor 5, the heated nuclear reactor coolant is sent to the steam generator 7 via the hot leg 6b by the nuclear reactor coolant pump 9. The high-temperature nuclear reactor coolant passing through the hot leg 6b is pressurized by the pressurizer 8 to restrict boiling and flows in the steam generator 7 in a high-temperature and high-pressure state. The high-temperature and high-pressure nuclear reactor coolant flowing in the steam generator 7 is cooled by heat exchange with the second coolant, and the cooled nuclear reactor coolant is sent to the nuclear reactor 5 via the cold leg 6a by the nuclear reactor coolant pump 9. The nuclear reactor 5 is cooled by the flow of the cooled nuclear reactor coolant in the nuclear reactor 5. That is, the nuclear reactor coolant circulates between the nuclear reactor 5 and the steam generator 7. Note that, the nuclear reactor coolant is light water to be used as a coolant and a neutron moderator.

The turbine system 4 includes a turbine 22 connected to the each steam generator 7 via a steam pipe 21, a condenser 23 connected to the turbine 22, and a feed water pump 24 interposed in a feed water pipe 26 connecting the condenser 23 to the each steam generator 7. To the turbine 22 is connected a generator 25.

Here, a sequence of operations in the turbine system 4 of the nuclear power plant 1 will be described. When steam flows in the turbine 22 via the steam pipe 21 from the steam generator 7, the turbine 22 is rotated. When the turbine 22 is rotated, the generator 25 connected to the turbine 22 generates electricity. Thereafter, steam flowing out of the turbine 22 flows in the condenser 23. The condenser 23 is provided therein with a cooling pipe 27, and one end of the cooling pipe 27 has connected thereto an intake pipe 28 taking cooling water (e.g., seawater) while the other end of the cooling pipe 27 has connected thereto a drain pipe 29 draining cooling water. The condenser 23 cools steam flowing from the turbine 22 by the cooling pipe 27 to turn the steam back to liquid. The secondary coolant as liquid is sent to the steam generator 7 via the feed water pipe 26 by the feed water pump 24. The secondary coolant sent to the steam generator 7 undergoes heat exchange with the nuclear reactor coolant in the steam generator 7 and becomes steam again.

Figure 2:
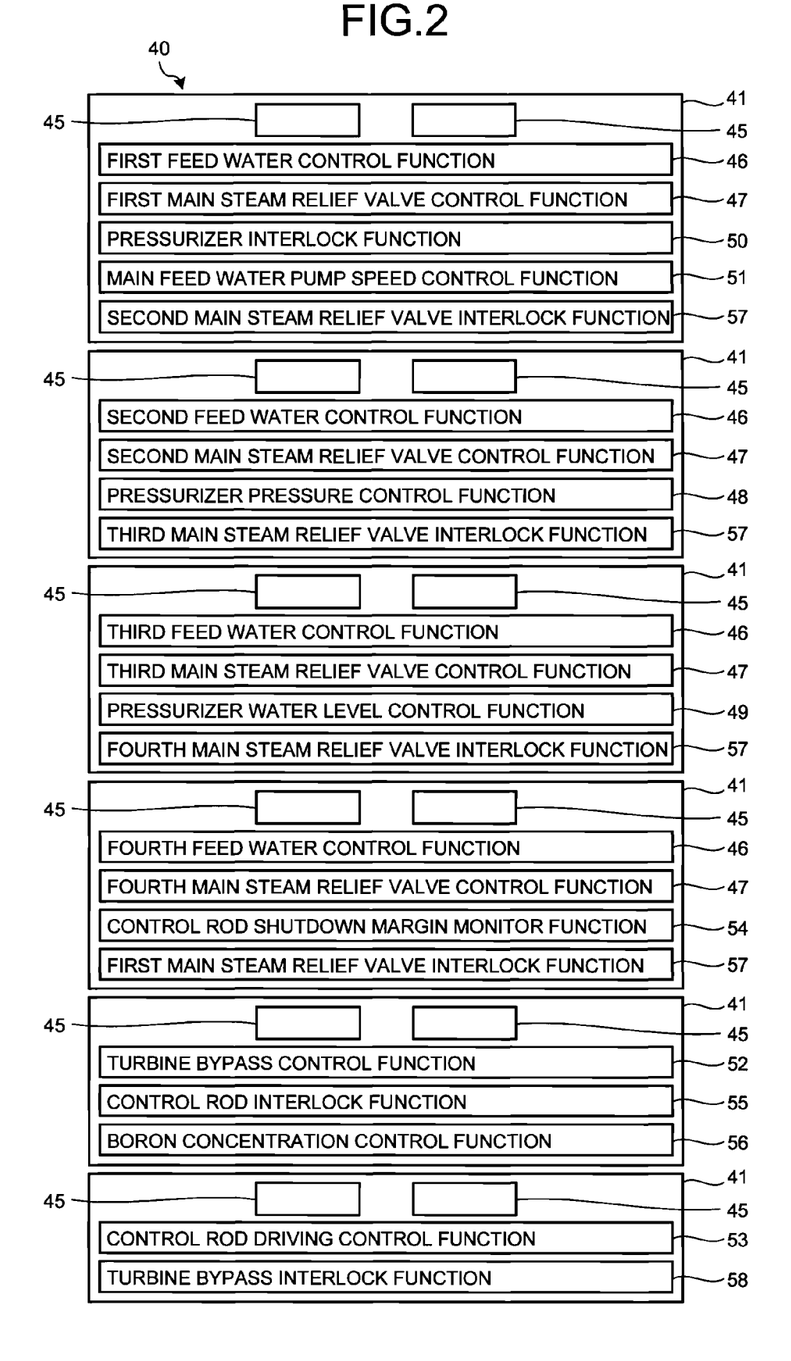
FIG. 2 illustrates a plurality of digital control devices into which a plurality of control functions are distributed based on safety analyses.

FIG. 2 illustrates a plurality of digital control devices into which a plurality of control functions are distributed based on safety analyses. The nuclear power plant 1 configured as above is provided with the control system 40 controlling actuation of respective units such as the aforementioned various pumps and not illustrated valves provided in the nuclear power plant 1 as illustrated in FIG. 2. This control system 40 includes a plurality of digital control devices 41, and the plurality of digital control devices 41 control operations of the nuclear power plant 1.

The digital control devices 41 include computing units such as CPUs and can control the nuclear power plant 1 by executing various programs by the computing units. Here, the digital control devices 41 include a plurality of computing units 45. Even when one computing unit 45 cannot be actuated due to a failure or the like, other computing units 45 are actuated to enable control of operations of the nuclear power plant 1.

Here, the plurality of digital control devices 41 have a plurality of various control functions controlling the nuclear power plant 1. Examples of the plurality of control functions are a feed water control function 46, a main steam relief valve control function 47, a main steam relief valve interlock function 57, a pressurizer pressure control function 48, a pressurizer water level control function 49, a pressurizer interlock function 50, a main feed water pump speed control function 51, a turbine bypass control function 52, a turbine bypass interlock function 58, a control rod driving control function 53, a control rod shutdown margin monitor function 54, a control rod interlock function 55, and a boron concentration control function 56.

The feed water control function 46 is a function of controlling a main feed water system that can supply the coolant to the steam generator 7 connected to the nuclear reactor 5. In a case where a plurality of steam generators 7 are provided in the nuclear power plant 1, a plurality of feed water control functions 46 are provided to correspond to the plurality of steam generators 7. The main steam relief valve control function 47 is a function of controlling a value that lets out steam in the steam generator 7. The main steam relief valve interlock function 57 is a function of locking control by the main steam relief valve control function 47. In this case as well, a plurality of main steam relief valve control functions 47 and main steam relief valve interlock functions 57 are provided to correspond to the plurality of steam generators 7.

The pressurizer pressure control function 48 is a function of controlling pressure in the pressurizer 8. The pressurizer water level control function 49 is a function of controlling water level in the pressurizer 8. The pressurizer interlock function 50 is a function of locking control by the pressurizer pressure control function 48 and the pressurizer water level control function 49.

The main feed water pump speed control function 51 is a function of controlling the feed water pump 24 that supplies the coolant to the steam generator 7 connected to the nuclear reactor 5. The turbine bypass control function 52 is a function of controlling a turbine bypass valve that lets out steam to be supplied from the steam generator 7 to the turbine 22. The turbine bypass interlock function 58 is a function of locking control by the turbine bypass control function 52.

The control rod driving control function 53 is a function of controlling driving of the control rods 16 to be inserted in the fuel assemblies 15. The control rod interlock function 55 is a function of locking control by the control rod driving control function 53. The control rod shutdown margin monitor function 54 is a function of monitoring a shutdown margin of the nuclear reactor 5 by the control rods 16. The boron concentration control function 56 is a function of controlling boron concentration in the coolant circulating in the nuclear reactor 5.

The aforementioned plurality of control functions are provided in the plurality of digital control devices 41 in a distributed manner. At this time, the plurality of control functions are distributed so that the digital control devices may not fall below safety standards preset by safety analyses.

Specifically, the plurality of control functions are distributed to avoid simultaneous occurrence of abnormalities in output of the nuclear reactor 5 and heat removal of the turbine system 4, simultaneous occurrence of abnormalities in output of the nuclear reactor 5 and pressure of the nuclear reactor cooling system 3, and simultaneous occurrence of abnormalities in pressure of the nuclear reactor cooling system 3 and heat removal of the turbine system 4. That is, in accordance with the safety analyses, the plurality of control functions are distributed into a control function on heat removal of the turbine system 4, a control function on pressure of the nuclear reactor cooling system 3, and a control function on output of the nuclear reactor.

Examples of the control function on heat removal of the turbine system 4 are the plurality of (4 in the present embodiment) feed water control functions 46, the plurality of (4 in the present embodiment) main steam relief valve control functions 47, the plurality of (4 in the present embodiment) main steam relief valve interlock functions 57, the turbine bypass control function 52, and the main feed water pump speed control function 51. At this time, the control functions on heat removal of the turbine system 4 are distributed to avoid simultaneous occurrence of 2 or more abnormalities of the plurality of feed water control functions 46, simultaneous occurrence of 2 or more abnormalities of the plurality of main steam relief valve control functions 47, and occurrence of an abnormality of the turbine bypass control function 52. That is, in accordance with the safety analyses, the plurality of feed water control functions 46 are distributed into the different digital control devices 41, respectively, and the plurality of main steam relief valve control functions 47 are distributed into the different digital control devices 41, respectively. Also, the main steam relief valve control function 47 and the main steam relief valve interlock function 57 corresponding to the main steam relief valve control function 47 are distributed into the different digital control devices 41, respectively, and the turbine bypass control function 52 and the turbine bypass interlock function 58 are distributed into the different digital control devices 41, respectively.

Examples of the control function on pressure of the nuclear reactor cooling system 3 are the pressurizer pressure control function 48 and the pressurizer interlock function 50. At this time, the control functions on pressure of the nuclear reactor cooling system 3 are distributed to avoid simultaneous occurrence of abnormalities of the pressurizer pressure control function 48 and the pressurizer interlock function 50. That is, in accordance with the safety analyses, the pressurizer pressure control function 48 and the pressurizer interlock function 50 are distributed into the different digital control devices 41, respectively.

Examples of the control function on output of the nuclear reactor are the control rod driving control function 53, the control rod interlock function 55, the boron concentration control function 56, and the control rod shutdown margin monitor function 54. At this time, the control functions on output of the nuclear reactor are distributed to avoid simultaneous occurrence of abnormalities of the control rod driving control function 53 and the control rod interlock function 55 and simultaneous occurrence of abnormalities of the control rod driving control function 53, the boron concentration control function 56, and the control rod shutdown margin monitor function 54. That is, in accordance with the safety analyses, the control rod driving control function 53 and the control rod interlock function 55 are distributed into the different digital control devices 41, respectively, and the control rod driving control function 53, the boron concentration control function 56, and the control rod shutdown margin monitor function 54 are distributed into the different digital control devices 41, respectively.

FIG. 2 illustrates a result of distribution of the plurality of control functions based on the safety analyses. In FIG. 2, the plurality of control functions are distributed in a case where the 6 digital control devices 41 are used, and where the 4 feed water control functions 46, the 4 main steam relief valve control functions 47, and the 4 main steam relief valve interlock functions 57 are provided. That is, the first digital control device 41 includes the first feed water control function 46, the first main steam relief valve control function 47, the pressurizer interlock function 50, the main feed water pump speed control function 51, and the second main steam relief valve interlock function 57. The second digital control device 41 includes the second feed water control function 46, the second main steam relief valve control function 47, the pressurizer pressure control function 48, and the third main steam relief valve interlock function 57. The third digital control device 41 includes the third feed water control function 46, the third main steam relief valve control function 47, the pressurizer water level control function 49, and the fourth main steam relief valve interlock function 57. The fourth digital control device 41 includes the fourth feed water control function 46, the fourth main steam relief valve control function 47, the control rod shutdown margin monitor function 54, and the first main steam relief valve interlock function 57. The fifth digital control device 41 includes the turbine bypass control function 52, the control rod interlock function 55, and the boron concentration control function 56. The sixth digital control device 41 includes the control rod driving control function 53 and the turbine bypass interlock function 58.

With the above configuration, a plurality of control means can be distributed into the plurality of digital control devices 41. Accordingly, even in a case where one digital control device 41 is failed to disable one control means, other control means in other digital control devices 41 can control the nuclear power plant 1. Thus, other digital control devices 41 can control the nuclear power plant 1 safely without falling below the safety standards. Here, safety control of the nuclear power plant 1 is described specifically. In a case where one out of the plurality of digital control devices 41 is failed, the control system 40 causes other digital control devices 41 to shut down operations of the nuclear power plant 1 while taking control so that other digital control devices 41 may not fall below the safety standards.

Specifically, the plurality of feed water control functions 46 can be distributed into the plurality of digital control devices 41. Accordingly, even in a case where one digital control device 41 is failed to disable one feed water control function 46 to control one main feed water system, other feed water control functions 46 in other digital control devices 41 can control other main feed water systems, respectively. Thus, the plurality of digital control devices 41 can control the nuclear power plant 1 safely.

Also, specifically, the pressurizer pressure control function 48 and the pressurizer interlock function 50 can be distributed into the plurality of digital control devices 41. Similarly, the main steam relief valve control function 47 and the main steam relief valve interlock function 57 corresponding to the main steam relief valve control function 47 can be distributed into the plurality of digital control devices 41. Similarly, the turbine bypass control function 52 and the turbine bypass interlock function 58 can be distributed into the plurality of digital control devices 41. Similarly, the control rod driving control function 53 and the control rod interlock function 55 can be distributed into the plurality of digital control devices 41. Accordingly, even in a case where one digital control device 41 is failed to cause the pressurizer pressure control function 48, the main steam relief valve control function 47, the turbine bypass control function 52, or the control rod driving control function 53 to be actuated improperly, the pressurizer interlock function 50, the main steam relief valve interlock function 57, the turbine bypass interlock function 58, or the control rod interlock function 55 in the other digital control device 41 can lock control of the pressurizer pressure control function 48, the main steam relief valve control function 47, the turbine bypass control function 52, or the control rod driving control function 53. Conversely, even in a case where the other digital control device 41 is failed to disable the pressurizer interlock function 50, the main steam relief valve interlock function 57, the turbine bypass interlock function 58, or the control rod interlock function 55 to function, the pressurizer pressure control function 48, the main steam relief valve control function 47, the turbine bypass control function 52, or the control rod driving control function 53 in one digital control device 41 can take control suitably. Thus, the plurality of digital control devices 41 can control the nuclear power plant 1 safely.

Also, specifically, the feed water control function 46 and the control rod driving control function 53 can be distributed into the plurality of digital control devices 41. Accordingly, even in a case where one digital control device 41 is failed to cause the control rod driving control function 53 to be actuated improperly, the feed water control function 46 in the other digital control device 41 can control the main feed water system and can control pressure of the nuclear reactor cooling system 3. Conversely, even in a case where the other digital control device 41 is failed to disable the feed water control function 46 to control the main feed water system, the control rod driving control function 53 in one digital control device 41 can control pressure of the nuclear reactor cooling system 3. Thus, the plurality of digital control devices 41 can control the nuclear power plant 1 safely.

Also, specifically, the control rod shutdown margin monitor function 54 and the boron concentration control function 56 can be distributed into the plurality of digital control devices 41. Accordingly, even in a case where one digital control device 41 is failed to disable the control rod shutdown margin monitor function 54 to function, the boron concentration control function 56 in the other digital control device 41 can control boron concentration and can control nuclear reactions. Conversely, even in a case where the other digital control device 41 is failed to disable the boron concentration control function 56 to control boron concentration, the control rod shutdown margin monitor function 54 in one digital control device 41 can monitor a shutdown margin of the nuclear reactor 5 by the control rods 16 and can take another measure.

Also, the digital control devices 41 include the plurality of computing units 45. Thus, even in a case where one computing unit 45 is not actuated due to a failure, other computing units 45 can execute the plurality of control functions. This can avoid loss of functions of the digital control devices 41 caused by a single failure.

It is to be noted that, although the present embodiments have been described by applying the present embodiments to a nuclear power plant as a plant, the present embodiments may be applied not only to this but also to a thermal power plant or a chemical plant.

INDUSTRIAL APPLICABILITY

As described above, the control system for a plant according to the present invention is useful in a nuclear power plant requiring enhanced safety and especially in a case where a plurality of digital control devices are used for control.

REFERENCE SIGNS LIST

1 NUCLEAR POWER PLANT
3 NUCLEAR REACTOR COOLING SYSTEM
4 TURBINE SYSTEM
5 NUCLEAR REACTOR
7 STEAM GENERATOR
8 PRESSURIZER
15 FUEL ASSEMBLY
16 CONTROL ROD
22 TURBINE
25 GENERATOR
40 CONTROL SYSTEM
41 DIGITAL CONTROL DEVICE
45 COMPUTING UNIT
46 FEED WATER CONTROL FUNCTION
47 MAIN STEAM RELIEF VALVE CONTROL FUNCTION
48 PRESSURIZER PRESSURE CONTROL FUNCTION
49 PRESSURIZER WATER LEVEL CONTROL FUNCTION
50 PRESSURIZER INTERLOCK FUNCTION
51 MAIN FEED WATER PUMP SPEED CONTROL FUNCTION
52 TURBINE BYPASS CONTROL FUNCTION
53 CONTROL ROD DRIVING CONTROL FUNCTION
54 CONTROL ROD SHUTDOWN MARGIN MONITOR FUNCTION
55 CONTROL ROD INTERLOCK FUNCTION
56 BORON CONCENTRATION CONTROL FUNCTION
57 MAIN STEAM RELIEF VALVE INTERLOCK FUNCTION
58 TURBINE BYPASS INTERLOCK FUNCTION

The invention claimed is:

1. A control system for a nuclear power plant, the nuclear power plant including a nuclear reactor cooling system including a nuclear reactor and a turbine system performing heat exchange with the nuclear reactor cooling system, comprising:

a first digital control device including a first programmable processor configured to perform a first feed water control function, a first main steam relief valve control function, a pressurizer interlock function, a main feed water pump speed control function, and a second main steam relief valve interlock function;

a second digital control device including a second programmable processor configured to perform a second feed water control function, a second main steam relief valve control function, a pressurizer pressure control function, and a third main steam relief valve interlock function;

a third digital control device including a third programmable processor configured to perform a third feed water control function, a third main steam relief valve control function, a pressurizer water level control function, and a fourth main steam relief valve interlock function;

a fourth digital control device including a fourth programmable processor configured to perform a fourth feed water control function, a fourth main steam relief valve control function, a control rod shutdown margin monitor function, and a first main steam relief valve interlock function;

a fifth digital control device including a fifth programmable processor configured to perform a turbine bypass control function, a control rod interlock function and a boron concentration control function; and a sixth digital control device including a sixth programmable processor configured to perform a control rod driving control function and a turbine bypass interlock function, wherein the control rod driving control function, the control rod interlock function, the boron concentration control function, and the control rod shutdown margin monitor function are control functions related to the output of the nuclear reactor, wherein the first through fourth feed water control functions, the first through fourth main steam relief valve control functions, the first through fourth main steam relief valve interlock functions, the turbine bypass control function, and the main feed water pump speed control function are control functions related to heat removal of the turbine system, and wherein the pressurizer pressure control function and the pressurizer interlock function are control functions related to the pressure of the nuclear reactor cooling system, wherein the first through fourth programmable processors are configured to perform the first through fourth feed water control functions, respectively, to avoid simultaneous occurrence of abnormalities in any two of the first through fourth feed water control functions, wherein the first through fourth programmable processors are configured to perform the first through fourth main steam relief valve control functions, respectively, to avoid simultaneous occurrence of abnormalities in any two of the first through fourth main steam relief valve control functions, wherein the fourth, first, second and third programmable processors are configured to perform the first, second, third and fourth main steam relief valve interlock functions, respectively, to avoid simultaneous occurrence of abnormalities in any two of the first through fourth main steam relief valve interlock functions, wherein the first through fourth programmable processors are configured to perform the first through fourth main steam relief valve control functions, respectively, and the fourth, first, second and third programmable processors are configured to perform the first through fourth main steam relief valve interlock functions, respectively, to avoid simultaneous occurrence of abnormalities in any one of the first through fourth main steam relief valve control functions and any one of the first through fourth main steam relief valve interlock functions, respectively, wherein the fifth programmable processor and the sixth programmable processor are configured to perform the turbine bypass control function and the turbine bypass interlock function, respectively, to avoid simultaneous occurrence of abnormalities in the turbine bypass control function and the turbine bypass interlock function, wherein the second programmable processor and the first programmable processor are configured to perform the pressurizer pressure control function and the pressurizer interlock function, respectively, to avoid simultaneous occurrence of abnormalities in the pressurizer pressure control function and the pressurizer interlock function, wherein the sixth programmable processor and the fifth programmable processor are configured to perform the control rod driving control function and the control rod interlock function, respectively, to avoid simultaneous occurrence of abnormalities in the control rod driving control function and the control rod interlock function, and wherein the sixth programmable processor is configured to perform the control rod driving control function to avoid simultaneous occurrence of abnormalities in the control rod driving control function and the first through fourth feed water control functions performed by the first through fourth programmable processors, respectively; and wherein the fifth programmable processor and the fourth programmable processor are configured to perform the boron concentration control function and the control rod shutdown margin monitor function, respectively, to avoid simultaneous occurrence of abnormalities in the boron concentration control function and the control rod shutdown margin monitor function.

2. The control system for a nuclear power plant according to claim 1, wherein the first through fourth programmable processors are configured such that when one of the first through fourth programmable processors fails to disable one of the first through fourth feed water control functions, respectively, the other programmable processors can control the other feed water control functions.

3. The control system for a nuclear power plant according to claim 1, wherein the first through fourth programmable processors are configured such that when one of the first through fourth programmable processors fails to cause one of the first through fourth main steam relief valve control functions to be actuated properly, the main steam relief valve interlock control function of the others of the first through fourth programmable processors lock control of the main steam relief valve control functions.

4. The control system for a nuclear power plant according to claim 1, wherein the first through fourth programmable processors are configured such that when one of the first through fourth programmable processors fails to disable its main steam relief valve interlock control function, the main steam relief valve control function of the others of the first through fourth programmable processors controls the main steam relief valve interlock control function.

5. The control system for a nuclear power plant according to claim 1, wherein the fifth and sixth programmable processors are configured such that when the fifth programmable processor fails to cause the turbine bypass control function to be actuated properly, the turbine bypass interlock function of the sixth programmable processor locks control of the turbine bypass control function.

6. The control system for a nuclear power plant according to claim 1, wherein the fifth and sixth programmable processors are configured such that when the sixth programmable processor fails to disable the turbine bypass interlock function, the turbine bypass control function of the fifth programmable processor performs suitable control.

7. The control system for a nuclear power plant according to claim 1, wherein the second and first programmable processors are configured such that when the second programmable processor fails to cause the pressurizer pressure control function to be actuated properly, the pressurizer interlock function of the first programmable processor locks control of the pressurizer pressure control function.

8. The control system for a nuclear power plant according to claim 1, wherein the second and first programmable processors are configured such that when the first programmable processor fails to disable the pressure interlock function, the pressurizer pressure control function of the second programmable processor performs suitable control.

9. The control system for a nuclear power plant according to claim 1, wherein the sixth and fifth programmable processors are configured such that when the sixth programmable processor fails to cause the control rod driving control function to be actuated properly, the control rod interlock function of the fifth programmable processor locks control of the control rod driving control function.

10. The control system for a nuclear power plant according to claim 1, wherein the sixth and fifth programmable processors are configured such that when the fifth programmable processor fails to disable the control rod interlock function, the control rod driving control function of the sixth programmable processor performs suitable control.

11. The control system for a nuclear power plant according to claim 1, wherein the sixth programmable processor is configured to perform the control rod driving control function and the first though fourth programmable processors are configured to perform first through fourth feed water control functions, respectively, such that when the sixth programmable processor fails to cause the control rod driving function to be actuated properly, the first through fourth feed water control functions of the first through fourth programmable processors, respectively, control a main feed water system to control pressure of the nuclear reactor cooling system.

12. The control system for a nuclear power plant according to claim 1, wherein the sixth programmable processor is configured to perform the control rod driving control function and the first though fourth programmable processors are configured to perform first through fourth feed water control functions, respectively, such that when one of the first through fourth digital control devices fails to disable the feed water control function, the sixth programmable processor controls the control rod driving function to control pressure of the nuclear reactor cooling system.

13. The control system for a nuclear power plant according to claim 1, wherein the fourth and fifth programmable processors are configured such that when the fourth programmable processor fails to disable the control rod margin monitor function, the boron concentration control function of the fifth programmable processor controls boron concentration to control nuclear reactions.

14. The control system for a nuclear power plant according to claim 1, wherein the fourth and fifth programmable processors are configured such that when the fifth programmable processor fails to disable the boron concentration control function, the fourth programmable processor controls the control rod margin monitor function to monitor a shutdown margin of the nuclear reactor by the control rods.

15. The control system for a nuclear power plant as a plant according to claim 1, wherein
the nuclear power plant includes a plurality of steam generators connected to the nuclear reactor, and a plurality of main feed water systems configured to supply a coolant to the respective steam generators, and
the first through fourth feed water control functions control the respective main feed water systems.

16. The control system for a nuclear power plant as a plant according to claim 1, wherein
the first main steam relief valve control function, the second main steam relief valve control function, the third main steam relief valve control function, the fourth main steam relief valve control function, the pressurizer pressure control function, the turbine bypass control function and the control rod driving control function are actuation control functions that control actuation of respective units provided in the nuclear power plant, and
the first main steam relief valve interlock function, the second main steam relief valve interlock function, the third main steam relief valve interlock function, the fourth main steam relief valve interlock function, the pressurizer interlock function, the turbine bypass interlock function and the control rod interlock function are functions that lock actuation control by the actuation control functions.

17. The control system for a nuclear power plant as a plant according to claim 1, wherein
the nuclear reactor houses therein a fuel assembly, a control rod driving unit configured to drive a control rod to be inserted in the fuel assembly, a steam generator connected to the nuclear reactor, and a main feed water system configured to supply a coolant to the steam generator, and
the control rod driving control function controls the control rod driving unit and the first through fourth feed water control functions respectively control the main feed water system.

18. The control system for a nuclear power plant as a plant according to claim 1, wherein
the nuclear reactor houses therein a fuel assembly and a control rod to be inserted in the fuel assembly and a boron concentration control unit configured to control boron concentration in a coolant circulating in the nuclear reactor, and
the control rod shutdown margin monitor function monitors a shutdown margin of the nuclear reactor by the control rod and the boron concentration control function controls the boron concentration control unit.

19. The control system for a nuclear power plant as a plant according to claim 1, wherein each of the plurality of digital control devices includes a plurality of the programmable processors.

* * * * *